No. 879,405.
PATENTED FEB. 18, 1908.
F. & F. T. McINTURF.
CORN HUSKING MACHINE.
APPLICATION FILED APR. 1, 1907.
3 SHEETS—SHEET 1.
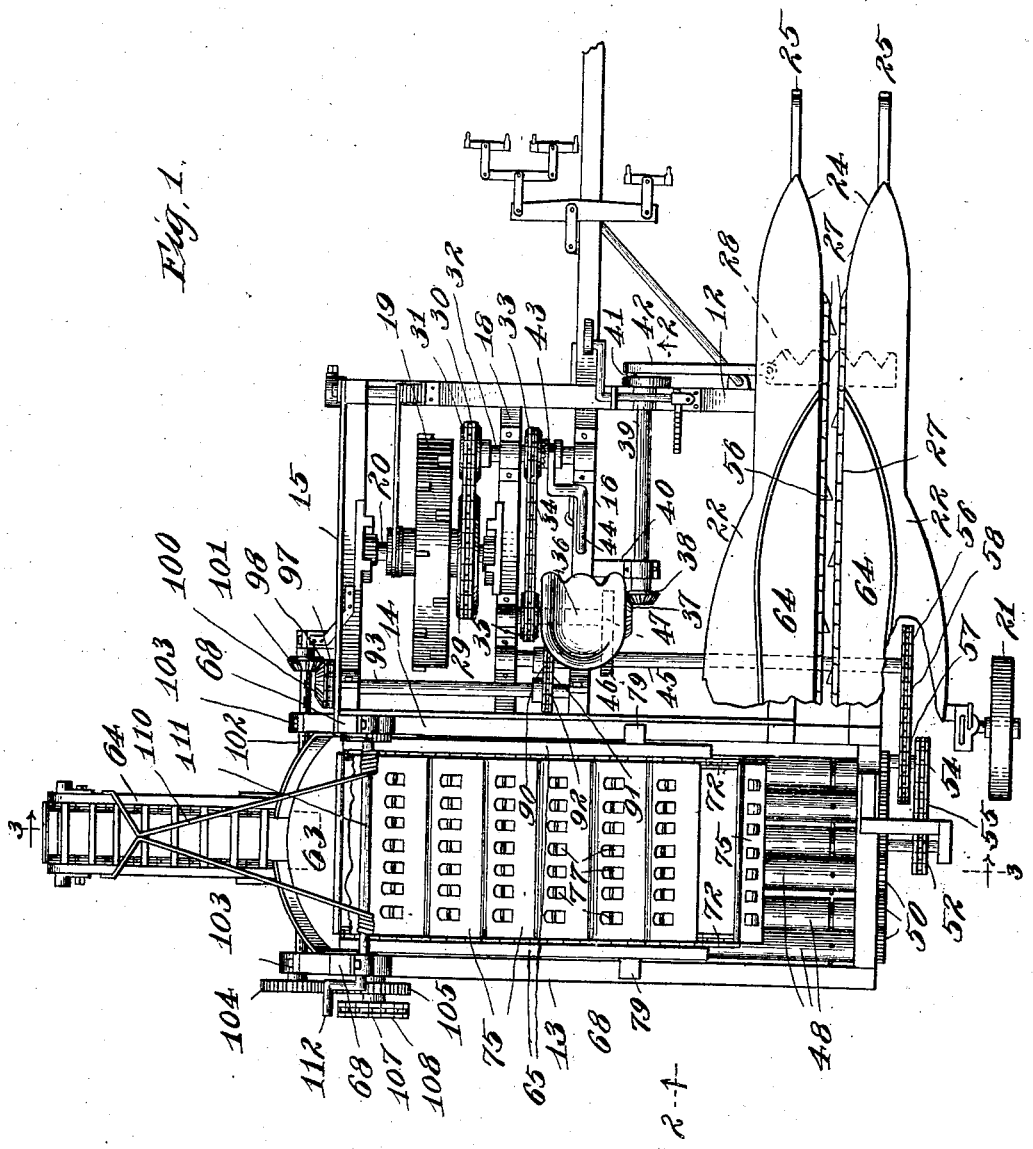

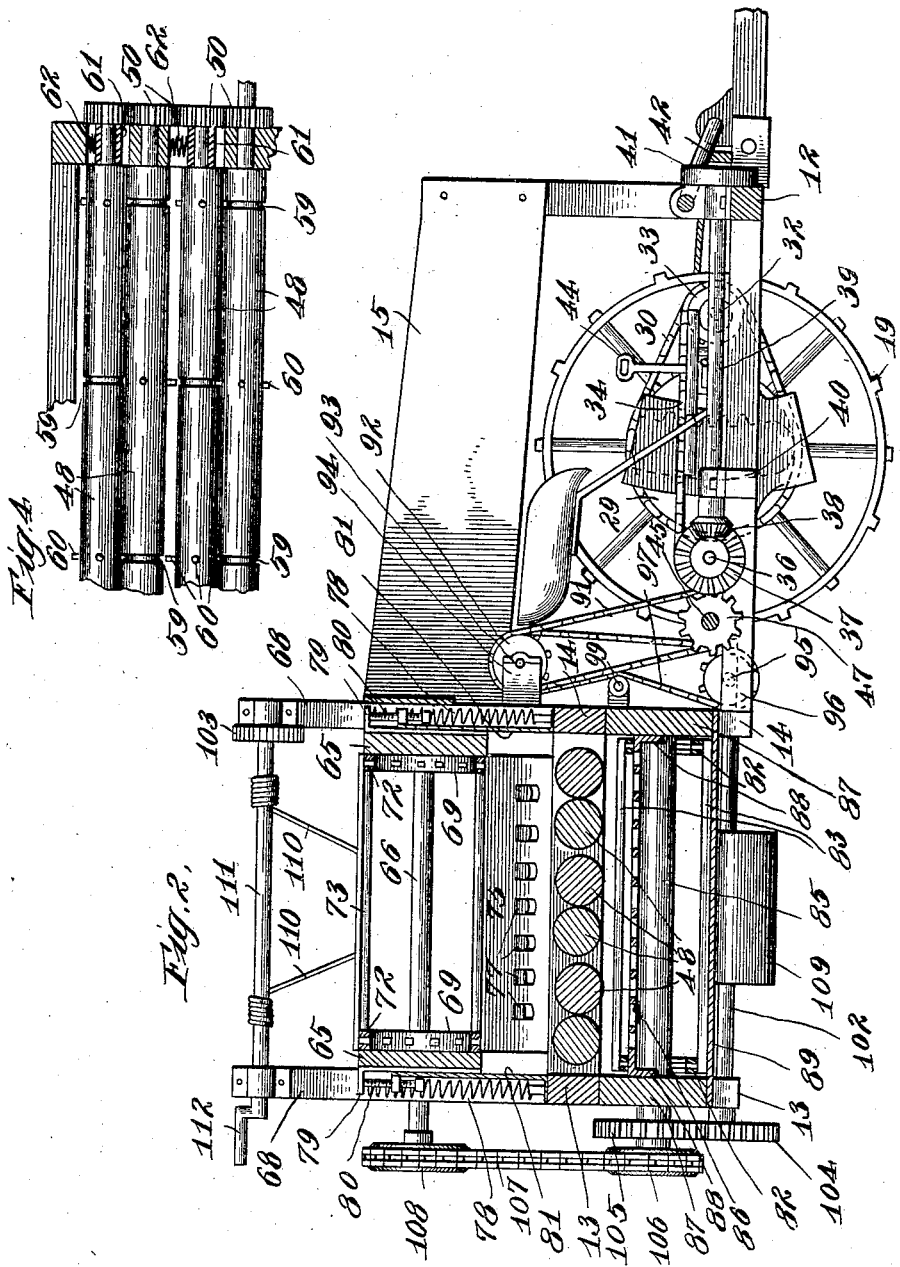

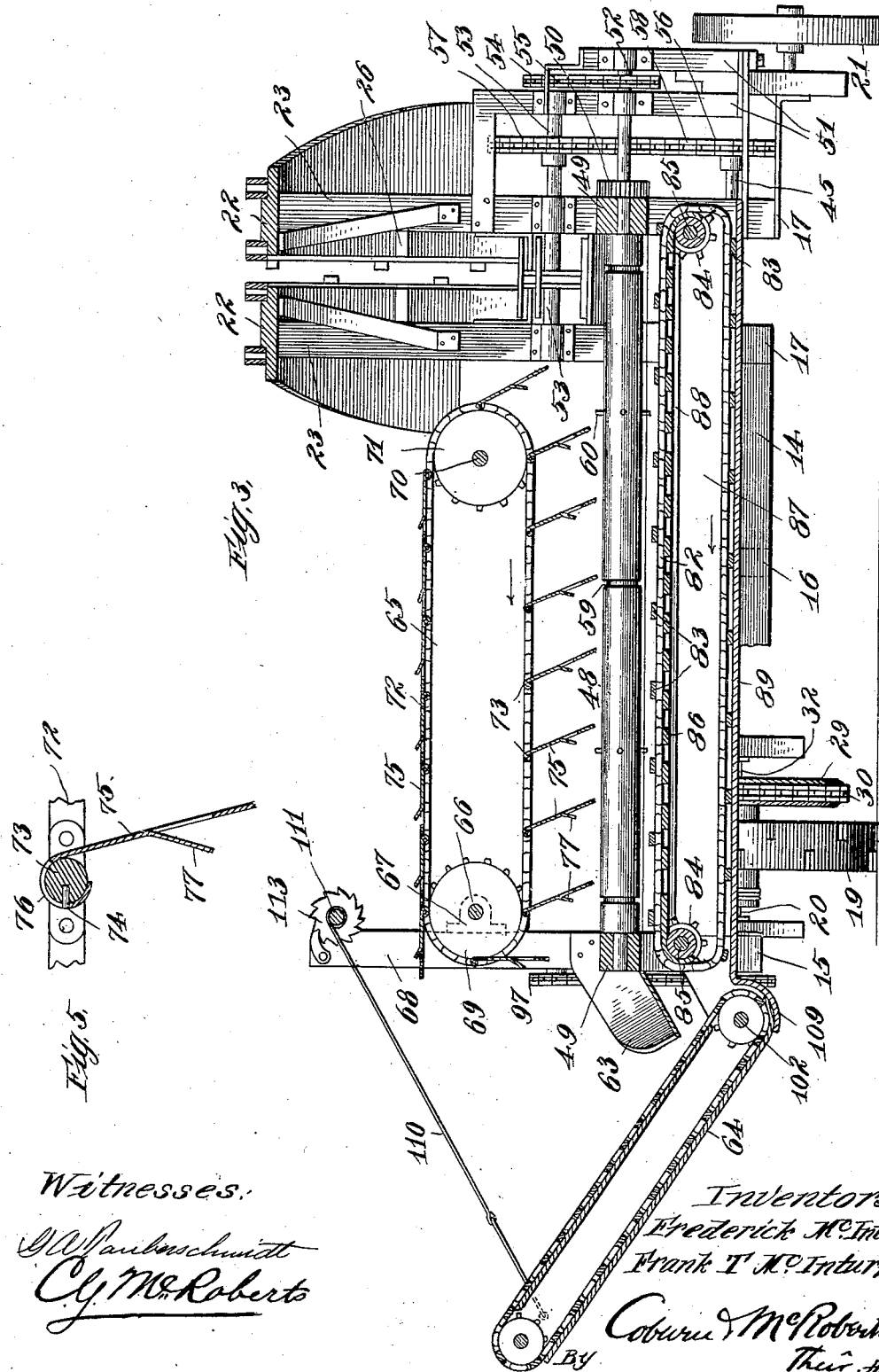

UNITED STATES PATENT OFFICE.

FREDERICK McINTURF AND FRANK T. McINTURF, OF MENDOTA, ILLINOIS.

CORN-HUSKING MACHINE.

No. 879,405.          Specification of Letters Patent.          Patented Feb. 18, 1908.

Original application filed February 26, 1906, Serial No. 302,948. Divided and this application filed April 1, 1907. Serial No. 365,628.

To all whom it may concern:

Be it known that we, FREDERICK McINTURF and FRANK T. McINTURF, citizens of the United States, residing at Mendota, in the county of Lasalle and State of Illinois, have invented certain new and useful Improvements in Corn-Husking Machines, of which the following is a specification, reference being had therein to the accompanying drawings.

Our invention relates to a corn husking machine, and the invention consists of the organizations and arrangements of parts hereinafter particularly described and then pointed out in the appended claims, this application being a division of our application filed February 26, 1906, Serial Number 302,948.

In the accompanying drawings—Figure 1 is a plan view of our corn husking machine shown associated with a corn harvesting machine with parts of the latter broken away to show the driving mechanism; Fig. 2 is a cross-sectional view on the line 2—2 of Fig. 1 on an enlarged scale; Fig. 3 is a sectional view on the line 3—3 of Fig. 1; Fig. 4 is a fragmentary plan view of the husking rolls; and Fig. 5 is a sectional view of one of the folding sections of the rake employed in connection with the husking rolls.

The frame of the machine may be of any suitable character. In the present instance it consists of front beam 12, rear beam 13, intermediate beam 14, a side beam 15, center beam 16, and a pair of parallel beams 17 at the side of the machine opposite the beam 15. A beam 18 is located between the side beam 15 and center beam 16. These beams forming the supporting frame of the machine may be secured together in any suitable manner. The frame is carried by a traction wheel 19 rotatably mounted on an axle 20 suitably supported by the beams 15 and 18, and a second wheel 21 located at the opposite side of the frame.

An inclined gathering board 22 is located over each of the beams 17, with their front ends extended beyond the front beam 12. These beams are supported near their rear ends by uprights 23 and at the front by the extended ends of the beams 17. The boards 22 are suitably spaced apart, as shown in Fig. 1, to permit of the passage of the stalks between the same. The inner edges of the boards 22 at their front ends are curved outwardly, as at 24, to provide a flaring mouth to guide the stalks between the same and to gather in any stalks which may be bent over or out of line. To facilitate this each board 22 at its front end is provided with a curved shoe or runner 25, which running along or close to the ground will pick up or straighten any stalks that may have fallen over. Under and parallel to each board 22 is a board 26, such boards being suitably supported by the frame. The boards 22 and 26 provide a supporting frame for the mechanism, such as the chains 27, for gathering the stalks and conveying them to suitable snapping rolls, not shown. To the rear of the front ends of the boards 22 and reciprocating in suitable guides, not shown, on the beams 17 is a cutter bar 28, such bar being located under the throat or passage between the boards 22 and 26.

The mechanism for harvesting the corn is made the subject-matter of our above recited application, and therefore forms no part of the present invention and will not be described in detail.

The hub of the wheel 19 is provided with a sprocket wheel 29, and a chain 30 communicates motion to a smaller sprocket wheel 31 fixed on a transverse shaft 32 suitably journaled on the beams 16 and 18. This shaft is provided with a second sprocket wheel 33 loosely mounted thereon to which is adapted a chain 34 communicating motion to a sprocket wheel 35 fixed on a shaft 36 also journaled on the beams 16 and 18. The shaft 36 extends beyond the beam 16 and is provided with a bevel gear 37 communicating motion to a similar gear 38 fixed on a longitudinal shaft 39. The shaft 39 is suitably journaled on a stub beam 40 fixed to the beam 16 and also at its front end on the beam 12. Beyond the beam 12 the shaft 39 is provided with a crank wheel 41 to the pin of which is pivoted a pitman 42 connected to and for reciprocating the cutter bar 28.

The traction wheel 19 communicates motion to the operating mechanism of the machine, and in order to throw such mechanism out of action while the traction wheel is in motion, a suitable clutch is provided. To this end the sprocket wheel 33 is engaged and disengaged by a sliding clutch 43 slidably mounted on the shaft 32 and controlled by a horizontal lever 44.

Referring to Fig. 1 a transverse shaft 45 is suitably journaled in the central beam 16 and the beams 17 and is provided with a pinion 46 which receives motion from a gear 47 fixed on the shaft 36. After the corn is stripped from the stalks by the snapping rolls (not shown), it falls upon the husking rollers 48 which are journaled in end-bars 49 of the frame. The rollers are parallel and disposed in the same plane and extend transversely of the machine, as shown in Fig. 1, and are arranged in pairs, and any suitable number of such pairs may be employed, three being shown in the present instance. The inner ends of the rolls are located under the snapping rolls so that the ears of corn will fall thereon. The shafts of the husking rolls are provided with intermeshing pinions 50, as shown in Figs. 1 and 4, and one of such shafts extends beyond its pinion and is suitably journaled in bearings on the uprights 51 and is provided with a sprocket gear 52. As shown in Fig. 3 a shaft 53 suitably journaled on the uprights 23 is provided with a sprocket gear 54 which communicates motion through the medium of a chain 55 to the sprocket gear 52. The shaft 45 is provided at its outer end with a sprocket gear 56 which furnishes motion to a sprocket gear 57 on the shaft 53 by means of a chain 58, as is clearly shown in Figs. 1 and 3.

As shown in Fig. 4, each husking roll is provided lengthwise thereof with alternating annular grooves 59 and radial pins 60, the pins on one roll of each pair being opposite and coöperating with the grooves of the other roll. These pins serve to strip the husks from the ears and the grooves provide clearance therefor, the rolls of each pair being close together. In order to prevent clogging of the rolls and to render the same yielding to inequalities of the husks the shaft of one roll of each pair is mounted in sliding bearings 61, as shown in Fig. 4, and an expansion spring 62 is employed to react against such bearing to press the roll thereof yieldingly against the other roll of the pair. At the outlet end of the husking rolls is a chute 63 the object of which is to discharge the corn on to the conveyer 64.

At opposite sides of the husking rolls 48 and located above the same is a pair of bars 65. These bars provide a pivoted rake-frame and at their outer ends are mounted on a shaft 66 carried in bearings 67 on suitable uprights 68. Near the ends of the shaft 66 and between the bars 65 are sprocket wheels 69. The inner ends of the bars 65 are connected by a shaft 70 provided with sprocket wheels 71. Chains 72 are carried by the sprockets 69 and 71 and these chains are connected at suitable intervals by cross rods 73 each having a radial stop pin 74, as shown in Fig. 5. On each rod 73 is a pivoted tooth 75 which consists in the present instance of a plate bent into the form of a loop at one end to receive the rod 73. The loop of each tooth has a slot 76 into which projects the stop pin 74. The function of these teeth is to move the ears of corn along the husking rolls to bring them under successive action of the pins 60 and finally push the ears on to the chute 63. The position of the slots 76 is such that the teeth hang at a trailing angle from the under stretch of the chains, as shown in Fig. 3, the teeth preferably being arrested at such angle by the ends of the slots and so as to just clear the pins 60. The teeth are free to swing upwardly and rearwardly, however, in the event that the ears of corn pile up on the husking rolls. These teeth are provided with fingers 77 which serve to assist the teeth in feeding the ears along the rolls. As the teeth pass from the under stretch of the chains around the sprockets 69 they hang vertically, thereby avoiding kicking or throwing the ears outwardly. On the upper or return stretch of the chains the teeth fold downwardly on and are supported in a horizontal position by the chains, on which the ends of the teeth rest, as shown in Fig. 3.

The rake-frame is yieldingly pressed towards the husking rolls 48 by suitable contractile springs 78 the lower ends of which are fixed to the frame of the machine while the upper ends are attached to ears 79 on the inner end of the rake-frame. The rake-frame normally rests on stops 80 carried by side plates 81 and engaged by the ears 79, and the relation of the teeth may be regulated as desired by the adjustment of the stops 80, which in the present instance take the form of screw bolts. In the event of crowding of the ears under the rake, the frame will readily yield owing to the springs, and avoid breakage of the parts. The side plates 81 are located at the sides of the rake and designed to prevent the escape of the ears during the husking operation.

An endless conveyer 82, moving in the direction of the arrow, Fig. 3, is located under and extends longitudinally of the husking rolls 48. This carrier consists of suitable side chains connected by slats 83, the chains being passed over end sprockets 84 which are fixed to shafts 85, suitably journaled on the frame. A reticulated or slotted plate 86, secured to side beams 87 by its flanges 88, is located under and provides a support for the upper stretch of the conveyer 82. The under or return stretch is supported by a suitably supported plate 89 located thereunder.

The rake and conveyer 82 are driven through the medium of suitable connections with the shaft 45. To this end such shaft is provided with a sprocket wheel 90 which transmits motion through the medium of a chain 91 to a sprocket 92 fixed on a shaft 93 suitably journaled in bearings fixed to the frame of the machine above the beams 15 and 16, one of which is shown in Fig. 2, as at 94. A stub shaft 95 is journaled on the beam 15 and is provided with a sprocket wheel 96 which receives motion through the medium of a chain 97 from a sprocket wheel 98 on the shaft 93. An idler 99 engaging the rear stretch of the chain 97 prevents contact of the latter with the side frame of the husking mechanism. The stub shaft 95 is provided with a bevel gear 100 which transmits motion to a similar gear 101 fixed on a shaft 102 journaled in bearings 103 on the frame of the machine at the end of the husking rolls. The opposite end of the shaft 102 is provided with a gear 104 which communicates motion to a gear 105 fixed on the shaft 85 at the outer end of the conveyer 82. Such shaft is also provided with a sprocket wheel 106 which communicates motion through the medium of a chain 107 to a sprocket 108 on the shaft 66 of the rake.

A curved trough 109 is located at the receiving end of the conveyer 64 under the chute 63 and this trough in the present instance consists of the extended end of the plate 89. The conveyer 64 may be of any suitable character and the bottom thereof is curved concentric with and extends into the trough 109, the receiving end of the conveyer being pivoted on the shaft 102 and receiving motion from such shaft. The conveyer 64 is designed to convey the ears to a wagon or any other point and is adjusted through the medium of a suitable cable 110 connected to a shaft 111 pivoted on the uprights 68, such shaft being provided with a crank 112 and a suitable pawl and ratchet 113.

In the operation of the machine, owing to the rotation of the husking rolls 48 and the action of the pins 60, the husks are torn from the ears, being discharged on to the conveyer 82 located under the husking rolls. These husks are carried by the conveyer 82 in the direction of the arrow in Fig. 3 and dropped on to the ground over the end of such conveyer. In the event that any corn is shelled during the husking operation it drops between the husking rollers and falls on to the plate 86, through the perforations of which it passes to the plate 89. The slats of the conveyer moving along this plate push such corn into the trough 109 from which it is removed by the conveyer and discharged into the receptacle designed to receive the ears of corn. During the husking operation the ears of corn are moved along the husking rollers to the outlet end thereof finally and when completely husked passing through the chute 63 to the elevator.

Having described our invention what we claim as new and desire to secure by Letters Patent of the United States, is—

1. In a corn husking machine, the combination of horizontal husking rolls to receive ears of corn, means for rotating the husking rolls, a shaft located above the discharge end of the rolls and provided with sprocket wheels, side bars pivoted to the shaft and extending parallel with the rolls, a second shaft connecting the free ends of the side bars and provided with sprocket wheels, an endless carrier on the sprockets, teeth pivoted to the carrier, and springs for pressing the free ends of the bars toward the rolls.

2. In a corn husking machine, the combination of horizontal husking rolls to receive ears of corn, means for rotating the husking rolls, a shaft located above the discharge end of the rolls and provided with sprocket wheels, side bars pivoted to the shaft and extending parallel with the rolls, a second shaft connecting the free ends of the side bars and provided with sprocket wheels, an endless carrier on the sprockets, teeth pivoted to the carrier, springs for pressing the free ends of the bars toward the rolls, and an adjustable stop device for the bars.

3. In a corn husking machine, the combination of horizontal husking rolls to receive ears of corn, means for rotating the husking rolls, a shaft located above the discharge end of the rolls and provided with sprocket wheels, side bars pivoted to the shaft and extending parallel with the rolls, a second shaft connecting the free ends of the side bars and provided with sprocket wheels, an endless carrier on the sprockets, teeth pivoted to the carrier, plates at the sides of the rolls and closing the space between the rolls and teeth, contractile springs at the free ends of the bars, lateral ears on the bars, and adjustable stops on the plates against which the ears are drawn by the springs.

4. In a corn husking machine, the combination of horizontal husking rolls arranged in pairs, one roll of each pair provided with radial fingers and the other with annular grooves, of a pivoted frame located over the husking rolls, springs for pressing the frame towards the rolls, a shaft at each end of the frame and provided with sprocket wheels, endless chains adapted to the sprocket wheels and provided with cross rods having stop pins, and rake teeth pivoted to the rods and arrested in an inclined position by the stop pins in position to clear the radial pins of the rolls.

5. In a corn husking machine, the combination with horizontally disposed husking rolls, of a frame located over the same, endless chains carried by the frame, cross rods connecting the chains and each of which is provided with a radial stop pin, and a rake tooth consisting of a plate having a loop at the one end to receive a rod, such loop being provided with a slot to limit the movement of the tooth, whereby each tooth depends at an angle from the lower stretch of the chains and folds or collapses against the chains upon the return stretch of the latter.

6. In a device of the class described, in combination, a yieldingly pivoted frame, a shaft at each end of the frame and provided with sprocket wheels, endless chains adapted to the sprocket wheels and provided with cross rods connecting the chains and having stop pins, rake teeth pivoted to the rods and arrested in an inclined position by the stop pins, fingers on the rake teeth, and means to rotate the shafts.

7. In a device of the class described, in combination, a pair of bars providing a rake frame mounted on shafts journaled in the outer and inner ends of the bars, sprocket wheels on the shafts, endless chains adapted to the sprocket wheels and provided with cross rods having stop pins, rake teeth having fingers pivoted to the rods and arrested in an inclined position by the stop pins, side plates having stops, ears on the inner ends of the bars engaging the stops, springs for holding the ears in yielding engagement with the stops, and means to turn the shafts.

8. In a corn husking machine, in combination, horizontally disposed husking rolls, a pivoted frame located over the husking rolls, a shaft at the inner and outer ends of the frame, sprocket wheels on the shafts, endless chains adapted to the sprocket wheels and connected by cross rods having stop pins, rake teeth pivoted to the rods and arrested in an inclined position by the stop pins and having fingers, side beams located under the husking rolls, a shaft journaled at the inner and outer ends of the side beams and provided with sprocket wheels, endless chains adapted to the sprocket wheels and having cross slats connecting the chains, a reticulated plate supporting the upper stretch of the carrier and an imperforate plate supporting the return stretch of the carrier, a gear and an additional sprocket wheel on the shaft at the outer end of the side beams, an additional sprocket wheel on the outer shaft of the frame, a chain adapted to the additional sprocket wheels, and means to rotate the gear.

In testimony whereof we affix our signatures in presence of two witnesses.

FREDERICK McINTURF.
FRANK T. McINTURF.

Witnesses:
BENJAMIN F. STUART,
JOHN F. W. WITTGAN.